United States Patent [19]

Brecht et al.

[11] 4,252,427
[45] Feb. 24, 1981

[54] MECHANISM AND METHOD OF PRODUCING INDICIA BEARING PLASTIC LAMINATED CARDS

[76] Inventors: Frederick R. Brecht, 3241 Duncan Ave., Sarasota, Fla. 33579; Leonard H. Daugherty, 745 47 St., Sarasota, Fla. 33580

[21] Appl. No.: 30,180

[22] Filed: Apr. 16, 1979

[51] Int. Cl.³ .................. G03B 27/32; G03B 17/24; G09F 3/02
[52] U.S. Cl. .................. 354/109; 40/2.2; 355/64
[58] Field of Search ............ 354/105, 109, 110, 120, 354/125, 121, 122, 123; 355/40 FP, 39, 20, 45, 64, 77; 40/2.2

[56] References Cited

U.S. PATENT DOCUMENTS

| | | | |
|---|---|---|---|
| 2,231,395 | 2/1941 | Schlegel | 355/45 X |
| 2,682,876 | 7/1954 | Martin | 354/109 X |
| 2,916,977 | 12/1959 | St. George | 354/109 |
| 2,953,073 | 9/1960 | Birch | 354/109 |
| 3,402,636 | 9/1968 | Gemmer et al. | 355/64 X |
| 3,633,472 | 1/1972 | Meyncke et al. | 354/109 |
| 3,758,970 | 9/1973 | Annenberg | 40/2.2 |
| 3,816,842 | 6/1974 | Glaros et al. | 355/64 X |
| 4,068,944 | 1/1978 | Leibundgut | 355/45 |
| 4,087,175 | 5/1978 | Johnson | 355/77 X |

OTHER PUBLICATIONS

I.B.M. Technical Disclosure Bulletin, vol. 15, No. 2, Jul. 1972, pp. 391-392.

Primary Examiner—Donald A. Griffin
Attorney, Agent, or Firm—Hauke & Patalidis

[57] ABSTRACT

A method of producing transparent indicia bearing plastic laminated identification cards, comprising storing individualized information on transparent or opaque sheets, or preferably, on a roll of microfilm, storing general information on a second transparent or opaque sheet or, preferably, on a slide displaying each of said portions of information, consecutively exposing adjacent frames of a roll of microfilm in a microfilm camera to each display by re-aiming, particularly by pivoting, said microfilm camera, developing said microfilm, and heat-sealing a pair of thermo-plastic sheets to surround the two frames of developed microfilm.

20 Claims, 7 Drawing Figures

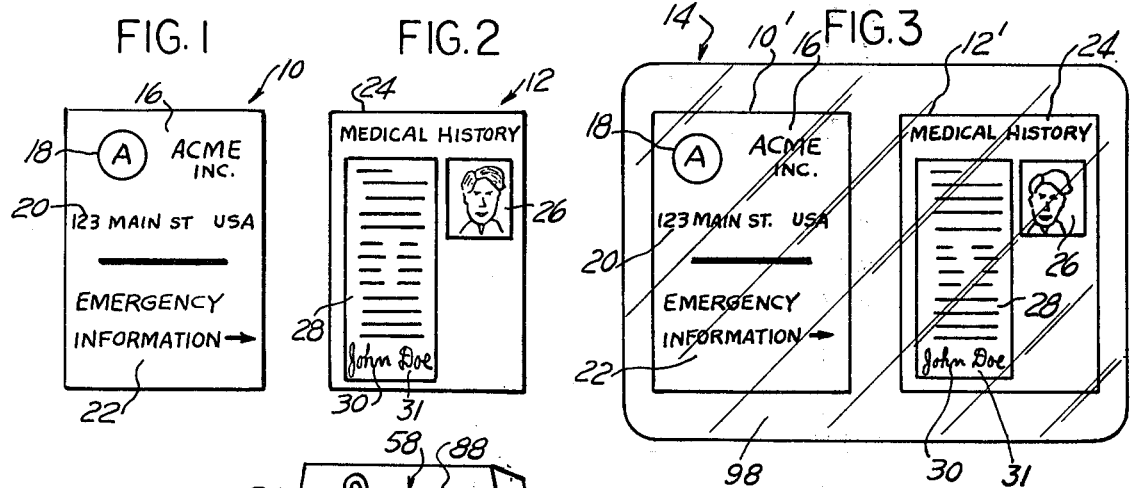
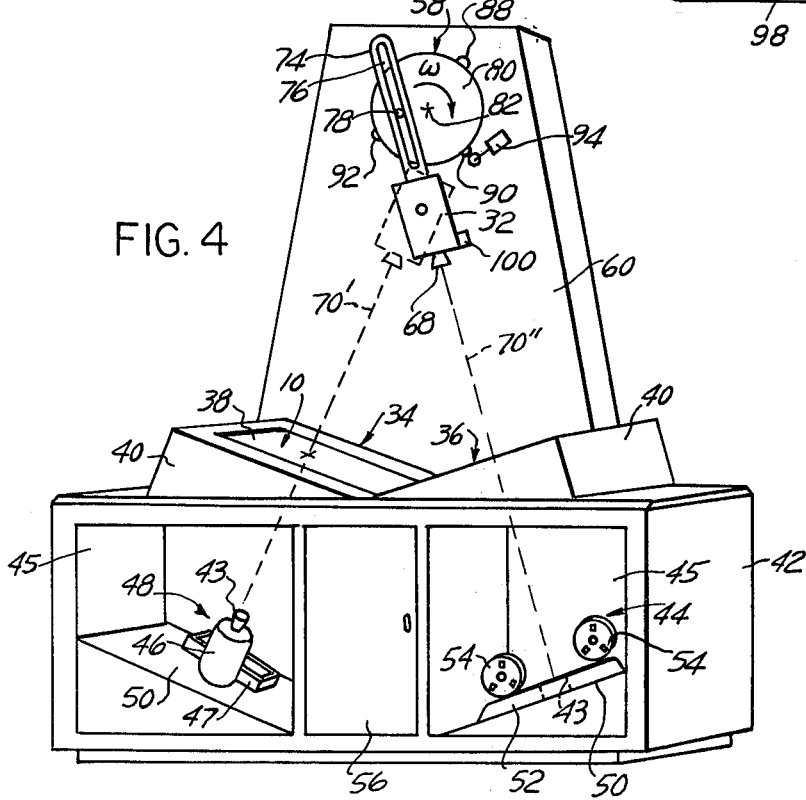
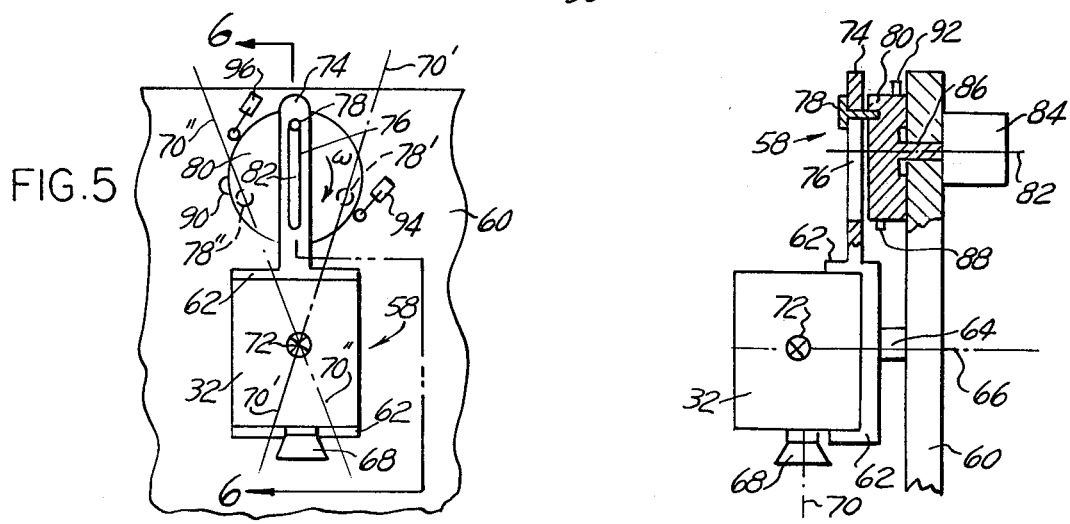

MECHANISM AND METHOD OF PRODUCING INDICIA BEARING PLASTIC LAMINATED CARDS

CROSS-REFERENCE TO RELATED APPLICATIONS

The present application is related to application Ser. No. 955,790, filed October 30, 1978 by one of co-applicants herein for Indicia Bearing Plastic Laminate and Method of Producing Same.

BACKGROUND OF THE INVENTION

Indicia bearing plastic laminated cards for personal identification purposes bearing individualized data such as medical information, name, address, and charge account number are well known. Usually, the card consists of information embossed, typed, or printed on a 50 mm by 75 mm cardboard or plastic card. As described in co-pending application Ser. No. 955,790, there are substantial disadvantages with the use of such cards. Depending on the form chosen, there is a great risk that there will be typing inaccuracies, the cost of equipment, material and labor are fairly high and the risk of fraud great, yet only a small amount of information may usually be stored. Additionally, and more importantly, when a cardboard or plastic base is employed, the resulting object is essentially opaque, and therefore reading by means of a microfilm viewer is impossible.

The improvement disclosed in co-pending application Ser. No. 955,790 consists of eliminating the cardboard base and instead heat-sealing two frames of microfilm adjacent to each other between two sheets of laminate so as to form a flatter, thinner, cheaper, transparent card, substantially the same in size as a conventional credit card which may be read with the naked eye in those portions using extremely large print and by means of a microfilm reader elsewhere. Such cards may be used to store credit information, security clearances, or any other type of data that may be too bulky to carry around in other than microfilm form, together with more general information such as the name and/or trademark, for example, of the named parties, an employer, an insurer, or a bank or other indicia of the nature of the card such as, for example "Credit Data", or "Health Record".

SUMMARY OF THE PRESENT INVENTION

The present invention relates to a method and machine for rapidly making essentially transparent information bearing plastic laminated cards and more particularly, for making such cards containing some generalized data applicable to several parties and containing other individualized data applicable only to a specifically named party. The method of the present invention comprises consecutively photographing a display of generalized information and a display of individualized information which may be stored on an opaque or transparent sheet but, preferably, is on a long roll of film containing, on each frame, the individualized information pertaining to one of several parties. The generalized information may also be on either an opaque or a transparent sheet or on film, but preferably is on a photographic slide transparency. When either or both of the generalized and individualized information is stored on film, the image of each is projected onto its own stationary rear projection screen oriented toward the camera.

Use of film to store information allows recording the individualized information in a compact form, facilitates efficient mass production of the cards, automatically produces a positive photographic transparency and creates a permanent record. Use of a pivoting microfilm camera for sequentially photographing two stationary information displays permits more rapid mass production of the cards than the use of a moving display or a laterally displaced camera, due to greatly reduced momentum.

Those and other objects and advantages of the present invention will become apparent to those skilled in the art when the detailed description, wherein like reference numerals refer to like components throughout, is read in conjunction with the accompanying drawings.

BRIEF DESCRIPTION OF THE DRAWING

FIG. 1 is a top plan view of an example of generalized information which may be utilized in the process of this invention;

FIG. 2 is a top plan view of an example of individualized information which may be used in the process of this invention;

FIG. 3 is a top plan view of a transparent information bearing plastic laminated card produced by the process and apparatus of the present invention and containing the information of FIGS. 1-2;

FIG. 4 is a schematic perspective view of an example of an apparatus for producing the transparent card of FIG. 3 according to the method of the present invention;

FIG. 5 is a schematic elevation view of the mounting assembly for the microfilm camera thereof;

FIG. 6 is a partial cross-sectional view taken substantially from line 6—6 of FIG. 5; and FIG. 7 is a schematic diagram of the rotatable wheel controlling the oscillation and function of the microfilm camera.

DETAILED DESCRIPTION OF THE PREFERRED EMBODIMENTS

Referring now to the drawing, and more particularly to FIGS. 1-3 thereof, there is shown at FIG. 1 an example of arbitrarily chosen general information 10, at FIG. 2 an example of individual information 12, and at FIG. 3 an information bearing laminated transparent card 14 made according to the method of the present invention containing microfilm reproduction 10' and 12' of the information. The general information 10 may incorporate therein the name of a group, club, association, organization, or corporation 16, a trademark or symbol 18, and such other general information as an address 20 or advertising (not shown). Additionally, the general information 10 may include other indicia such as that designated at 22 of FIG. 1, indicating the general nature of the individual information contained on the card, for example, "Emergency Information" or "Credit Data".

The specific information 12 may include, for example, and as shown, a caption 24 in large size characters, a person's photograph 26, the person's signature 30 in large handwriting and printed or typewritten data 28 in a greatly reduced size. Other types of information, not shown at FIG. 2, may be provided, such as fingerprints, coded electronically readable information, security clearance rating and data and the like.

The novel article produced by the method and apparatus of the present invention has numerous applications. For example, it is within the contemplation of this invention that the indicia bearing plastic laminated card may contain reproductions of important papers and documents recorded by microfilming on a pocket-size plastic card, 14, lists of household items and serial numbers, description of valuable jewelry, insurance policy information and numbers. In another example of use, a card can be produced which lists an individual's credit card numbers, driver's license and auto tag numbers. In the example illustrated in FIG. 2, the emergency data portion 28 includes such information as blood type, the bearer's name, address, birthdate, next of kin, information relating to his susceptibility to various drugs, past medical history, organ donation information, and a wide variety of other pertinent data such as the name and policy number of the health insurer. In other words, any items of which a permanent microfilm record is desired may be produced by this invention.

It is within the contemplation of this invention that the individualized small print data portion 28 may be initially produced in letter-size and typewritten, and it can thus be appreciated that, for example, voluminous medical history data can be embodied and effectively reproduced by microfilming techniques. Preferably, in its initial form the data portion 28 is a printed form, having a plurality of pre-printed information categories with blank spaces for filling in data appropriate to the particular person and incorporating a large area 31 on which that person may affix a large signature 30 so as to be readable by the naked eye when the entire form is reduced on microfilm, thus immediately identifying the proper party for a particular microfilm history. As will be explained later in greater detail, the form, whether opaque or transparent, may be used directly by apparatus made according to the present invention, but preferably all the individual information 12 which is desired for the card 14 is reduced on a reel of microfilm first, one frame corresponding to each party for whom a card is to be made, by photography methods commonly known in the art. Use of microfilm to store the individualized information prior to producing the cards allows for recording of the individualized information at remote locations in a compact, easily shipped form to be forwarded to a central processing location where the cards 14 are mass produced. Furthermore, it will automatically result in the card having a positive of the individual information 12 since the microfilm negative will be re-photographed. Finally, the reel of microfilm produced may be kept by the identification card issuer, be it an insurance company, a credit bureau, a bank, a club, or an employer as a permanent record, for its own use, to make replacement for lost cards, and to assist in the detection of frauds or alterations.

Similarly, the general information 10 may be fixed on a large transparent or opaque sheet but, for convenience of stoage, is preferably preserved on photographic slide transparencies. As will become apparent as the method of the present invention is described, preserving the general information on photographic slides will allow the central processor to easily switch between the production of several different types of identification cards.

FIG. 4 schematically shows an example of an apparatus for producing the card 14 according to the present invention comprising a microfilm camera 32 pivotably mounted above a pair of stationary informational displays 34 and 36 displaying the generalized and the individualized information 10 and 12 respectively. Each informational display comprises a rear projection screen 38 mounted within a frame 40 disposed on the top of a cabinet 42 such that the surfaces of the two screens slope upwardly from the top of the cabinet and toward each other. For each display, there is a projector 44 or 48, each within a lateral compartment 45 in the cabinet 42, the lens 43 of each projector optically aligned with the center of the corresponding screen, and its optical axis being accurately aligned perpendicular to the plane of the screen.

In the preferred embodiment, the projector 48 used for the generalized information display 34 is a conventional slide projector 46 with a tray of slides 47, each slide containing the generalized information used for a particular type of card 14, mounted on a platform 50 parallel to the rear projection screen 38. The projector 44 preferred for the individualized information display 36 is a reel-type microfilm projector 52 provided with supply and take-up reels 54 and loaded with a roll of processed microfilm containing consecutive frames of individualized microfilm information 12 for a sizeable number of parties as previously described, preferably all corresponding to the same generalized information 10. The projector 52 is a conventional microfilm projector, modified if desired, to accept large supply and take-up reels to reduce labor and down-time in the event that the apparatus is in constant use. The microfilm projector 52 is also mounted on a sloping platform 50 disposed substantially parallel to the corresponding rear projection screen. A third compartment provided with a door 56, shown in the example illustrated between the two projector compartments 45, may be used for storing the film used in the projectors or the camera or any other necessary equipment.

The microfilm camera 32 is mounted on a pivoting assembly 58, FIGS. 4–7, mounted to an upright support wall 60 which may, for simplicity, be a board or plate mounted to the back of cabinet 42. The assembly 58 comprises a bracket 62, supporting the camera 32, pivotally mounted on the support wall 60 by means of a stub shaft 64 journalled through appropriate bearings, not shown. The pivot axis 66 of the assembly 58 is chosen so that the camera 32 may pivot into alignment with each of the information displays 34 and 36 and be in focus in both orientations. When oriented towards the individual information display 34, for example, as shown in FIG. 4, the optical axis 70' of the lens 68 of camera 32 must be orthogonal to and centered on the display and when oriented towards the general information display 36, as shown in broken line in FIG. 4, the optical axis 70" is likewise orthogonal to and centered on that display.

Preferably, the camera pivot axis 66 passes through the intersection of the lines defining the optical axes 70 in the two exposure orientations. Furthermore, either optical axis 70 in either orientation should be perpendicular and centered on the screens 38 during exposure. In this manner, the distance from each screen 38 to the lens 68 will be identical in each respective orientation and both the adjustment of the location of the camera 32 within the assembly and adjustment of the focus will be simplified. If possible, a camera may be chosen or mounted such that the center of mass 72 of the assembly 58 lies as close as possible to the pivoting line 66, thereby reducing inertial problems.

Formed integrally with or welded to the bracket 62 supporting the camera 32 is a cam follower arm 74 with a long slot 76 for a pin 78 mounted perpendicular to a rotating camming wheel 80 such as to drive the camera assembly 58 from a maximum positive angle to a maximum negative angle and back again once per revolution. To assure that the maximum positive and negative angles are equal the center 82 of the wheel 80 is directly above the pivot line 66. For ease of design and adjustment, the center line of slot 76 is shown in the same plane as the optical axis 70 of the camera. Therefore, by locating the pin 78 at the proper radial distance, the maximum angles for advance of the camera will be achieved when the pin is at 78' and 78", FIG. 5, each corresponding to the orientations when the slot 76 is tangent to the arc defined by the path of the pin 78 as the wheel 80 rotates. At these two points, the pin will lie along the lines 70' or 70" orthogonal to the display 34 or 36 and the film will be exposed.

As seen in FIG. 6, the wheel 80 may be driven at a constant speed $\omega$ by a motor 84 mounted to the back of wall 60 through a shaft 86.

Assuming a straight slot 76 is used, assuming the shutter of the camera 32 is kept open for a time t and the camming wheel 80 moves at speed $\omega$ and assuming that the maximum angle in each direction to which the camera pivots is $\theta$ (see FIG. 5), the angular motion $\phi$ of the camera during exposure for the configuration shown and described is determined by the formula:

$$\phi = -\tan^{-1}\left(\frac{\cos \omega t - 1}{\sin \omega t + \cot \theta}\right)$$

which, for values of $\theta$ less than 45° and for common shutter speeds of 1/60th of a second or greater, approximates to:

$$\phi = \frac{N^2 t^2 \pi}{10} \tan \theta$$

wherein N is the number of personalized identification cards 14 to be produced each minute, or, alternatively expressed, the rpm speed of the camming wheel 80, and t is the shutter speed of the camera in seconds. The following chart generated by the above formulae demonstrates how little the lens will move for various values of $\theta$, N, and t.

|  |  | $\theta = 45°$ $\phi = (.56Nt)^2$ | $\theta = 30°$ $\phi = (.43Nt)^2$ | $\theta = 15°$ $\phi = (.29Nt)^2$ |
|---|---|---|---|---|
|  | t = 1/60 | .033° | .02 | .01 |
| N = 20 | t = 1/125 | .01° | .005 | .0025 |
|  | t = 1/250 | .002° | .0013 | .0005 |
|  | t = 1/60 | .3° | .18 | .08 |
| N = 60 | t = 1/125 | .08° | .046 | .021 |
|  | t = 250 | .02° | .012 | .005 |
|  | t = 1/250 | .50 | .3 | .13 |
| N = 300 |  |  |  |  |

While the microfilm camera will be moving at a slow speed at this point compared to the shutter speed and thus producing very little blurring, an appropriate curved slot 76 could be designed if desired to temporarily hold the camera motionless. It is important to note that the motion becomes increasingly important as the information of the lens contains smaller and smaller print or details.

The wheel 80 may also be used to control the timing of the shutter and to trigger the advance of the film within the microfilm camera and the advance of the film for the microfilm projector by means of three blip-like camming surfaces 88, 90 and 92, each activating one of a pair of microswitches 94 and 96. As shown in FIGS. 5-7, the shutter triggering blips 90 and 92 may be timed by locating one proximate the pin 78 and the other an angle $\alpha$ away, and locating the follower arm of the switch 94 as indicated. The camming surface 88 and the switch 96 to advance the film in the projector one frame may be located as shown an angle $\beta$ away from and in a different plane than the blips 90 and 92 so as to advance the film at approximately the time that the general information is being photographed.

After the reel of microfilm within the camera 32 is exhausted, the film is removed, developed and cut so that each microfilm frame 10' of individual information, together with an associated microfilm frame 12' of specific information may be heat-sealed between a pair of transparent plastic sheets 96 and 98, FIG. 3, by means well known in the art to form a wallet-sized identification card 14.

As previously suggested, the equipment described may be used, when necessary, to produce cards 14 according to the present invention when all or part of the information 10 and 12 is not available on film but instead is fixed on a large transparent or opaque sheet by simply laying the sheet atop the appropriate display 34 or 36. If the sheet is opaque, a flash 100 or alternative source of overhead light may be provided. If the sheet is transparent, on the other hand, the lamp of projector 44 below the screen may be used without a slide in front of it as sublighting or an alternative source of sublighting may be used. This is particularly useful, for example, if there is so small a number of identification cards being made for some particular group that reducing the original of the general information 10 for that group to permanent slide form is not warranted.

Having thus described the present invention by way of the example of a preferred embodiment thereof, given for illustrative purposes only and not by way of limitation, modifications thereof will be readily apparent to those skilled in the art, what is claimed as novel is as follows:

We claim:

1. The method of producing substantially transparent information bearing plastic laminated cards containing both individual and general information comprising the steps of displaying said general information on a first stationary information display, displaying said individual information on a second stationary information display adjacent to said first stationary information display and disposed at an angle thereto, pivotally mounting a microfilm camera having an optical axis and containing a reel of unexposed microfilm above said stationary information displays, pivoting said microfilm camera to a first angular orientation wherein said optical axis of said microfilm camera is orthogonal to said first stationary information display, exposing a first frame of said microfilm to said first display, advancing said microfilm within said microfilm camera, pivoting said microfilm camera to a second angular orientation wherein said optical axis of said microfilm camera is orthogonal to said second stationary information display, exposing a second adjacent frame of said second display, processing said microfilm, and heat-sealing said two adjacent frames of processed microfilm between a pair of transparent thermoplastic sheets.

2. The method of claim 1 further comprising storing at least part of said information on a photographic slide transparency, and projecting the image contained on said slide onto one of said stationary information displays, said stationary information display comprising a projection screen.

3. The method of claim 1 further comprising storing at least part of said information on a frame of a second roll of microfilm and projecting the image contained on said frame onto one of said stationary information displays, said stationary information display coprising a projection screen.

4. The method of claims 2 or 3 wherein said projection screen is a rear projection screen.

5. The method of claim 1 wherein at least one of said stationary information displays comprises a sublit platform and a transparent sheet containing said information placed upon said platform.

6. The method of claim 1 wherein at least one of said stationary information displays comprises a platform and an opaque sheet containing said information placed upon said platform.

7. The method of claim 1 further comprising pivoting said microfilm camera on a line substantially through its center of mass.

8. The method of claim 1 further comprising pivoting said microfilm camera on a point substantially in line with said optical axis of said microfilm camera.

9. An apparatus for mass producing microfilm transparencies for making substantially transparent information bearing plastic laminated cards containing both individual and general information, said apparatus comprising a first stationary information display displaying said general information, a second stationary information display adjacent to said first stationary information display, said second display displaying said individual information, stationary support means, a microfilm camera having an optical axis and pivotally mounted to said support means above said displays, and means pivoting said camera from a first orientation wherein said optical axis is orthogonal to said first stationary information display to a second orientation wherein said optical axis is orthogonal to said second stationary information display, wherein said second stationary information display comprises a rear projection screen and a reel-type microfilm projector and said means pivoting said microfilm camera comprises a motor driven wheel mounted to said wall, a cam on said wheel, a bracket supporting said camera pivotally mounted to said support means, and a cam follower arm projecting from said bracket and driven by said cam.

10. The apparatus of claim 9 wherein said first stationary information display comprises a rear projector screen and a slide projector.

11. The apparatus of claim 9 wherein said microfilm camera is pivoted on a point substantially in line with said optical axis of said microfilm camera.

12. The apparatus of claim 9 further comprising at least one microswitch mounted to said support means, said microswitch controlling the film advance of said microfilm camera and at least one camming surface on said wheel activating said microswitch.

13. The apparatus of claim 9 further comprising at least one microswitch mounted to said support means, said microswitch controlling the film advance of said reel type microfilm projector, and at least one camming surface on said wheel activating said microswitch.

14. An apparatus for mass producing microfilm transparencies for making substantially transparent information bearing plastic laminated cards containing both individual and general information, said apparatus comprising a first stationary information display displaying said general information, a second stationary information display adjacent to said first stationary information display and disposed at an angle thereto, said second display displaying said individual information, stationary support means, a microfilm camera having an optical axis and pivotally mounted to said support means above said displays, drive means pivoting said camera from a first angular orientation wherein said optical axis is orthogonal to said first stationary information display to a second angular orientation wherein said optical axis is orthogonal to said second stationary information display, and means actuating said camera for taking an exposure at each of said first and second angular orientations.

15. The apparatus of claim 14 wherein said first stationary information display comprises a rear projector screen and a slide projector.

16. The apparatus of claim 14 wherein said microfilm camera is pivoted on a point substantially in line with said optical axis of said microfilm camera.

17. The apparatus of claim 14 wherein said second stationary information display comprises a rear projection screen and a reel-type microfilm projector.

18. The apparatus of claim 17 wherein said drive means pivoting said microfilm camera comprises a motor driven wheel mounted to said wall, a cam on said wheel, a bracket supporting said camera pivotally mounted to said support means, and a cam follower arm projecting from said bracket and driven by said cam.

19. The apparatus of claim 18 further comprising at least one microswitch mounted to said support means, said microswitch controlling the film advance of said microfilm camera and at least one camming surface on said wheel activating said microswitch.

20. The apparatus of claim 18 further comprising at least one microswitch mounted to said support means, said microswitch controlling the film advance of said reel type microfilm projector, and at least one camming surface on said wheel activating said microswitch.

* * * * *

UNITED STATES PATENT AND TRADEMARK OFFICE
CERTIFICATE OF CORRECTION

PATENT NO. : 4,252,427

DATED : February 24, 1981

INVENTOR(S) : Frederick R. Brecht and Leonard H. Daugherty

It is certified that error appears in the above-identified patent and that said Letters Patent are hereby corrected as shown below:

Col. 3, line 58, change "stoage" to --storage--.

Col. 6, line 19, delete "96 and".

Col. 7, line 11, change "coprising" to --comprising--.

Signed and Sealed this

Twenty-first Day of July 1981

[SEAL]

Attest:

GERALD J. MOSSINGHOFF

Attesting Officer

Commissioner of Patents and Trademarks